US010437633B1

(12) United States Patent
Lu et al.

(10) Patent No.: US 10,437,633 B1
(45) Date of Patent: Oct. 8, 2019

(54) DATA STORAGE SYSTEM MANAGEMENT WITH PROMOTION OF TASK-LEVEL RESOURCE IDENTIFIERS TO HIGHER OBJECTS

(71) Applicant: EMC IP Holding Company LLC, Hopkinton, MA (US)

(72) Inventors: Binhua Lu, Shanghai (CN); Dazhi Dong, Shanghai (CN); Xing Chen, Shanghai (CN); Chen Zhang, Shanghai (CN); Xiaogang Wang, Shanghai (CN); James O. Pendergraft, Raleigh, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 266 days.

(21) Appl. No.: 15/395,862

(22) Filed: Dec. 30, 2016

(51) Int. Cl.
*G06F 9/44* (2018.01)
*G06F 9/48* (2006.01)
*G06F 11/30* (2006.01)
*G06F 11/34* (2006.01)

(52) U.S. Cl.
CPC ........ *G06F 9/4843* (2013.01); *G06F 11/3017* (2013.01); *G06F 11/3034* (2013.01); *G06F 11/3495* (2013.01)

(58) Field of Classification Search
CPC ............... G06F 9/4881; G06F 12/0866; G06F 17/30315; G06F 3/0685; G06F 9/5005; G06F 9/5011; G06F 9/5033
See application file for complete search history.

(56) References Cited

U.S. PATENT DOCUMENTS

| 2005/0033800 | A1* | 2/2005 | Kavuri | G06F 3/0605 |
| | | | | 709/201 |
| 2006/0026016 | A1* | 2/2006 | Honda | G06F 17/30315 |
| | | | | 705/1.1 |
| 2007/0061804 | A1 | 3/2007 | Anzelde et al. | |
| 2011/0138391 | A1* | 6/2011 | Cho | G06F 9/4881 |
| | | | | 718/102 |
| 2013/0332612 | A1* | 12/2013 | Cai | G06F 9/5066 |
| | | | | 709/226 |
| 2015/0169729 | A1* | 6/2015 | Kumano | G06F 21/6245 |
| | | | | 707/738 |
| 2016/0085587 | A1* | 3/2016 | Dube | G06F 9/5011 |
| | | | | 718/104 |
| 2016/0335134 | A1* | 11/2016 | Gupta | G06F 9/5016 |

* cited by examiner

*Primary Examiner* — Dong U Kim
(74) *Attorney, Agent, or Firm* — BainwoodHuang

(57) ABSTRACT

A data storage system executes a system management component initiating and monitoring a multi-task job affecting a storage resource such as a storage device. Execution includes maintaining a job data object and a set of task data objects for the multi-task job. A task operates upon the storage resource has a respective task data object containing an identifier of the storage resource as a task-affected storage resource. The job data object is used by a job-level function (e.g., job level of a management GUI) and initially lacks the identifier of the storage resource. During execution, the identifier of the storage resource is copied from the task data object to the job data object as an identifier of a job-affected storage resource, which is then used in subsequent performance of the job-level function (e.g., displaying a hyperlink for the storage resource in a job-level screen of the management GUI).

20 Claims, 6 Drawing Sheets

DATA STORAGE SYSTEM MANAGEMENT WITH PROMOTION OF TASK-LEVEL RESOURCE IDENTIFIERS TO HIGHER OBJECTS

BACKGROUND

The invention is related to the field of data storage systems, and in particular to data storage system management.

SUMMARY

The invention is described herein with reference to particular examples or embodiments. Those skilled in the art will appreciate that other embodiments and applications are possible.

In system management operations for a data storage system, referred to herein as "data storage system management", it is known to utilize automated tasks and higher-level "jobs" for complex system management operations. For example, creating a host-usable file system can involve many separate operations, such as creating a virtual server instance, obtaining an allocation of raw storage (extents) from a pool of available storage capacity, defining addressable logical units (LUNs) of storage and applying protection (e.g., RAID) if necessary, formatting the extents according to the file system type and any special requirements of the application, etc. These operations can be automated using tasks and jobs as described herein. The automated operations are initiated and monitored for correct completion by a storage administrator as a system management user, typically via a user interface such as a graphical user interface (GUI) or command line interface (CLI).

In some systems, when an operation is initialized by a storage administrator, a storage management application creates a process referred to as a "job" to control the operation and track its status. Detailed operations, including operations on particular storage resources (e.g., disk drive or LUN), may be delegated to lower-level tasks. The storage administrator can monitor the status through the user interface. In at least some of these systems, the user interface may not include an identifier of a particular storage resource that the job is operating on. If the job is short-lived this may not be a problem, because the storage administrator may retain such details in his/her memory. However, some jobs may take a long time to complete, such as those that involve copying large extents of data from one device to another while the data storage system continues to operate in a production manner. For such jobs, even the storage administrator may not remember the identity of the affected storage resources, let alone some other user who did not initiate the job. If an issue happens during job execution, it may be difficult for the storage administrator to take proper actions because there is no detail about the affected storage resource. The storage administrator (or other user) wanting to know the affected storage resources must drill down into lower layers of the user interface to obtain this information, which is inefficient.

Thus some embodiments are directed to associating a storage resource that is affected by a lower-level task of a job with the job itself, directly. This association can be used, for example, to provide a link or other identifier of the affected storage resource at a job-level screen of a GUI. This can enable a user such as a storage administrator to easily navigate to a part of the GUI for obtaining information about the affected storage resource, without having to first go through multiple steps just to identify that resource, thus promoting efficiency.

More particularly in such embodiments, a job may be a multiple-level logical arrangement having user-visible Batch Jobs, Jobs and Tasks utilized by the system management application. Each level can have associated storage resources. A Task is a leaf object which performs specific operations directly on an affected storage resource (e.g., creating it, duplicating it, etc.), so a task embeds the storage resource information into an associated task data object. A Job is higher level object which organizes different tasks to complete one user request. Because the Job is organized rather than directly operating on storage resources, it has no inherent knowledge about the storage resource detail. There may also be higher-level Batch Job objects to organize different operations (Jobs) for a user request, and these also may have no inherent knowledge of the specific storage resources that are affected by underlying Tasks.

Generally, the disclosed techniques are directed to making Task-level information available at a higher Job or Batch Job level, so that higher-level activity (such as human interaction with the system management application) can be performed more efficiently, i.e., without requiring extra steps to obtain the information at the Task level where it natively resides. In one embodiment, a Job may identify child Tasks that should promote identified Task-level information to the Job itself. Analogously, a Batch Job can specify which child Job should promote Job-level information to the Batch Job itself. With the associated storage resource included in the higher-level Job or Batch Job, a system user can more immediately see which resources are affected and take proper action on a target storage resource if any error happens. In one example, a hyperlink may be used at a Job-level GUI screen, so a user can easily navigate directly to a GUI page for an affected resource by clicking on the hyperlink.

More particularly, a method is disclosed of operating a data storage system executing a system management component for initiating and monitoring a multi-task job affecting a storage resource of the data storage system. The multi-task job has an organizational job-level function and lower-level tasks. The method includes:

maintaining a job data object and a set of task data objects for the multi-task job, at least one of the tasks operating upon the storage resource and having a respective task data object containing an identifier of the storage resource as a task-affected storage resource, the job data object being used by the job-level function (e.g., the job level of a management GUI) and initially lacking the identifier of the storage resource;

during execution of the multi-task job, copying the identifier of the storage resource from the task data object to the job data object as an identifier of a job-affected storage resource; and utilizing the identifier of the storage resource from the job data object in subsequent performance of the job-level function (e.g., displaying a hyperlink for the storage resource in a job-level screen of the management GUI).

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
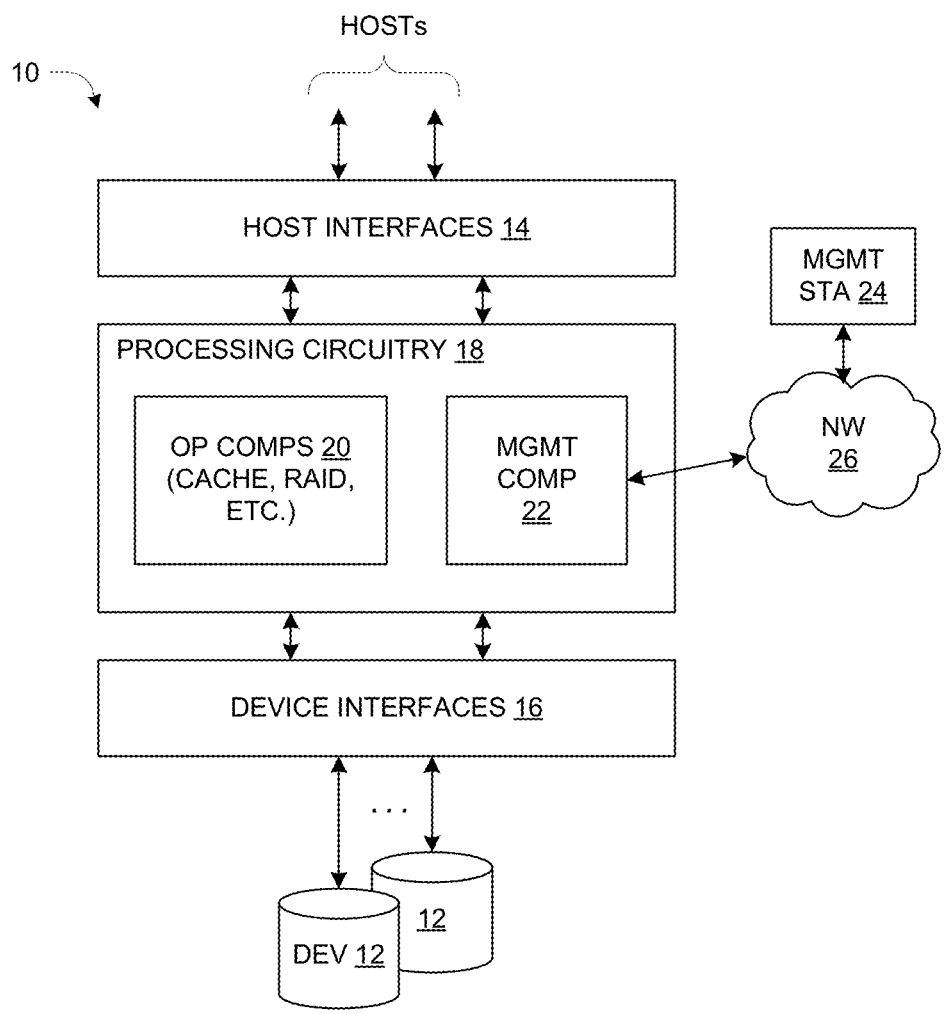
FIG. 1 is a block diagram of a data storage system.

FIG. 1 shows a data storage system 10 which provides data storage services to host computers (HOSTS) (not shown) using data storage devices (DEVs) 12, such as magnetic disks, Flash memory, etc. From a hardware perspective, the data storage system includes host interfaces 14, device interfaces 16, and processing circuitry 18. Both the host interfaces 14 and device interfaces 16 are typically interfaces to storage-oriented interconnects, such as Fibre-Channel, iSCSI, etc. The processing circuitry includes one or more processors, memory and I/O interface circuitry connected together by high-speed, intra-system interconnect (details not shown), as generally known in the art. The processing circuitry 18 executed computer program instructions to form functional operation components which are shown as operating components (OP COMPs) 20 and a management component (MGMT COMP) 22. The operating components 20 are datapath items such as a storage cache, RAID subsystem, etc., working in a coordinated manner to provide secondary storage functionality as generally known in the art. The management component 22 provides system management functionality, some of which is described in more detail herein. One general example of a storage system management component 22 is the Unisphere® system manager deployed in data storage systems sold by Dell EMC. As shown the management component 22 interfaces to a separate management station (MGMT STA) 24 via a network 26.

As mentioned above, in data storage system management, it is known to utilize automated tasks and higher-level jobs for complex system management operations, such as creating a host-usable file system, that are initiated and monitored by a storage administrator as a system management user. In the example of creating a host-usable file system, the overall process may be assigned as a job, while the many separate sub-operations (creating a virtual server instance, obtaining an allocation of raw storage (extents) from a pool of available storage capacity, defining addressable logical units (LUNs) of storage and applying protection (e.g., RAID) if necessary, formatting the extents according to the file system type and any special requirements of the application, etc.) are underlying tasks.

The storage administrator is typically provided a management system user interface at the management station 24, such as a graphical user interface (GUI) and/or command line interface (CLI), which is used by the management system user to initiate and monitor the automated job and tasks. In some cases the interface may be served by the management component 22, and the management station 24 uses a so-called "thin client" such as a browser. In other cases the management station 24 may be a "thick client" executing a management client application and having primarily a data-exchange interface with the management component 22. Generally the management component 22 performs various management-related functions, which include providing the appropriate interface to the system management user via the user interface provided on the management station 24. The present description focuses on delivery of a hypertext GUI as an example, but the disclosed techniques may be used in support of other functions as will be clear from the description below.

Figure 2:
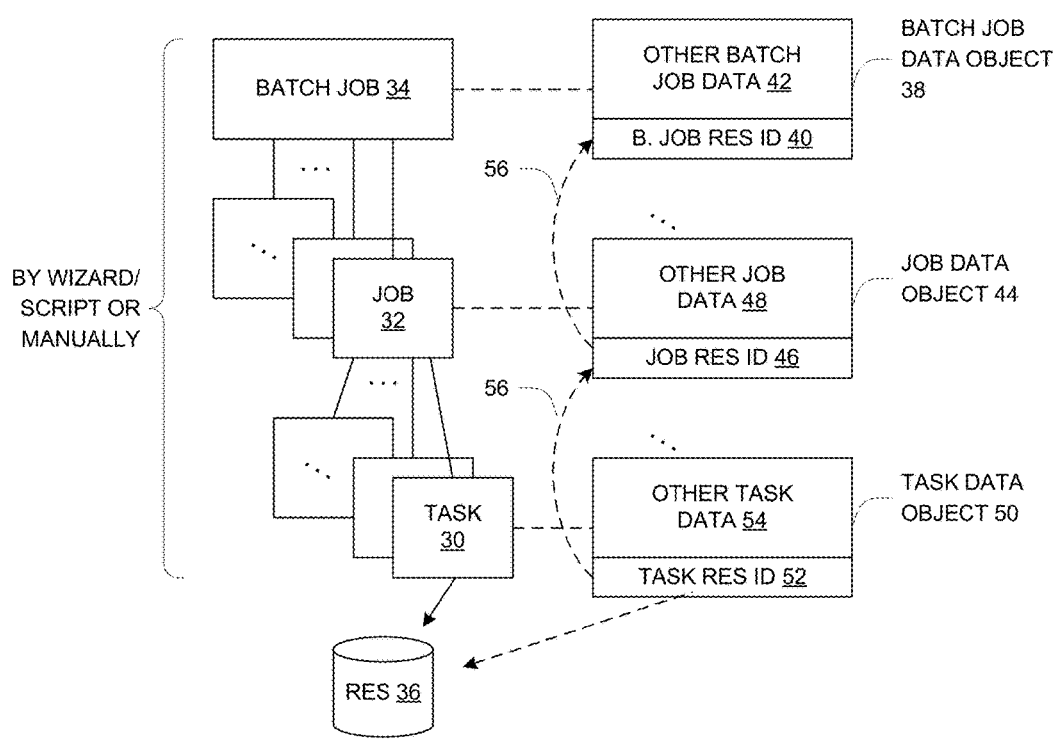
FIG. 2 is a schematic diagram of a multi-level set of jobs and tasks and associated data objects.

FIG. 2 shows an organization of functional sub-components of the management component 22 used in connection with system management operations, especially those of relative complexity that require performing several tasks in some sequence. In particular, FIG. 2 shows a multi-level set of jobs and tasks and associated data objects, where the jobs and tasks include control elements (e.g., sets of system management commands) and the data objects store associated system management data used in connection with the system management operations.

On the control side, at left in FIG. 2 are tasks 30, jobs 32 and batch jobs 34. In this example, the jobs 32 are subordinate to a batch job 34, and sets of tasks 30 are subordinate to a respective job 32. These items may be created by action of an automated component such as a wizard or script, or by manual action of a storage administrator using features of the user interface. One or more of the tasks 30 operates directly upon a storage resource (RES) 36, which may be a storage device 12 (FIG. 1) or a logical device defined within the data storage system 10 (e.g., a LUN, logical volume, virtual volume (VVOL), etc.). Operating "directly" upon a resource 36 means performing an operation that itself creates, modifies, or deletes the resource 36, rather than doing so indirectly by invoking another task, job, etc. The batch job 34 has an associated batch job data object 38, which includes a batch job resource identifier (B JOB RES ID) 40 and other batch job data 42. Similarly, each job 32 has an associated job data object 44, which includes a job resource identifier (JOB RES ID) 46 and other job data 48, and each task 30 has an associated task data object 50, which includes a task resource identifier (TASK RES ID) 52 and other task data 54. Specific examples of the resource identifiers and their use is provided below. As indicated by arrows 56, during operation the task resource identifier 52 is copied ("promoted") to one or more job data objects 44 to become also a respective job resource identifier 46, and a job resource identifier 46 may be copied/promoted to a batch job data object 38 to become also a respective batch job resource identifier 40.

In some embodiments, the promotion of resource IDs 52, 46 may be controlled by explicit parameters or properties maintained as part of one or more of the data objects 38, 44, 50. The following are examples of parameters that may be used:

| Object | Parameter Name | Format | Comment |
|---|---|---|---|
| Task/Job | AffectedResource | resource_type: resource_id: resource_name | Resource_type, Resource_id: internally used for GUI page navigation<br>Resource_name: User-friendly name presented on GUI |
| Task | PromoteAffectedResource | 0, 1, 2, 3 | 0: No promote<br>1: Promote to task group. |

-continued

| Object | Parameter Name | Format | Comment |
|---|---|---|---|
| | | | 2: Promote to job object |
| | | | 3: Promote to both task group and job object |

In the above scheme, AffectedResource refers to the respective resource identifier 40, 46, and 52, and PromoteAffectedResource is a parameter controlling whether and how the AffectedResource value is copied (promoted) to a parent object. As an example, if PromoteAffectedResource is set to the value 2 in a given task data object 50, then the task resource ID 52 of that task data object 50 is copied to the parent job data object 44 as the job resource identifier 46. This means that the value of the task resource identifier 52 is now directly available to the respective job 32 as the job resource identifier 46, rather than requiring one or more indirections to obtain the value from an underlying task 30.

Figure 3:
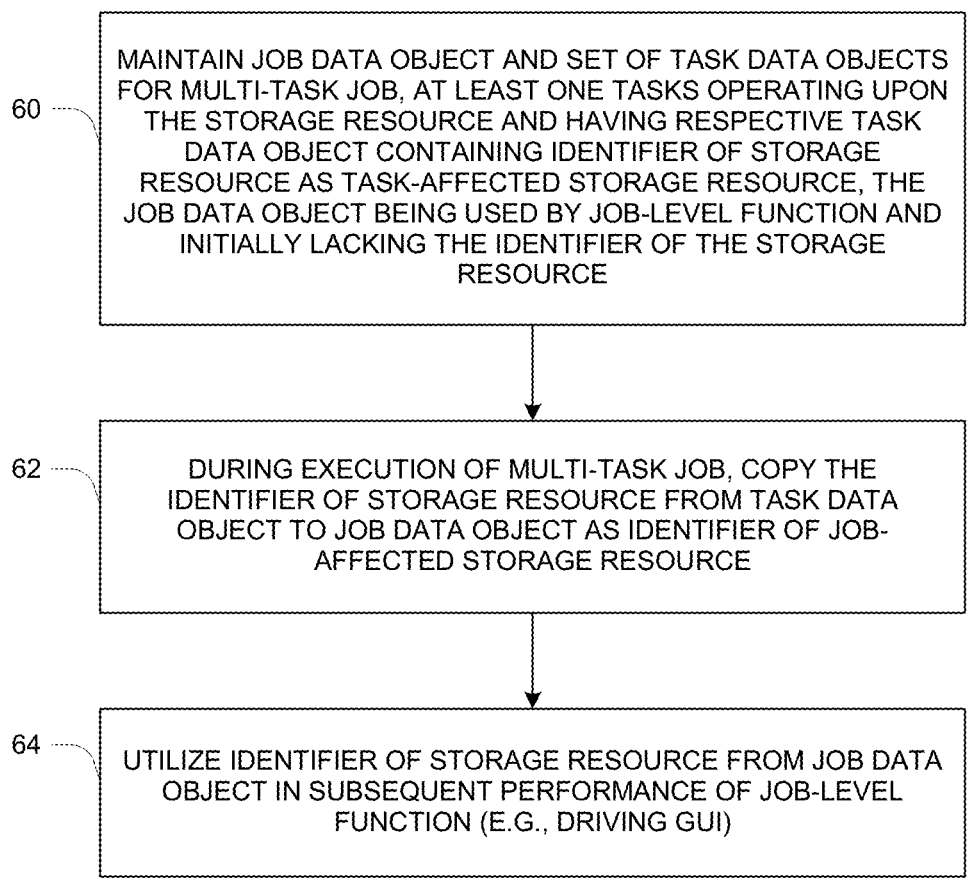
FIG. 3 is a flow diagram of certain operation at a high level.

FIG. 3 illustrates high-level operation of a system management component (e.g., management component 22) for initiating and monitoring a multi-task job (e.g., a job 32) affecting a storage resource (e.g., 36) of a data storage system, wherein the multi-task job has an organizational job-level function and lower-level tasks (e.g., 30). Again, specific uses are described below.

At 60, a job data object (e.g., 44) and a set of task data objects (e.g., 50) are maintained for the multi-task job. At least one of the tasks operates upon the storage resource and has a respective task data object containing an identifier of the storage resource (e.g., task resource ID 52) as a task-affected storage resource. The job data object is used by the job-level function and initially lacks the identifier of the storage resource.

At 62, during execution of the multi-task job, the identifier of the storage resource is copied from the task data object to the job data object as an identifier of a job-affected storage resource (e.g., job resource identifier 46).

At 64, the identifier of the storage resource from the job data object is utilized in subsequent performance of the job-level function.

Figure 4:
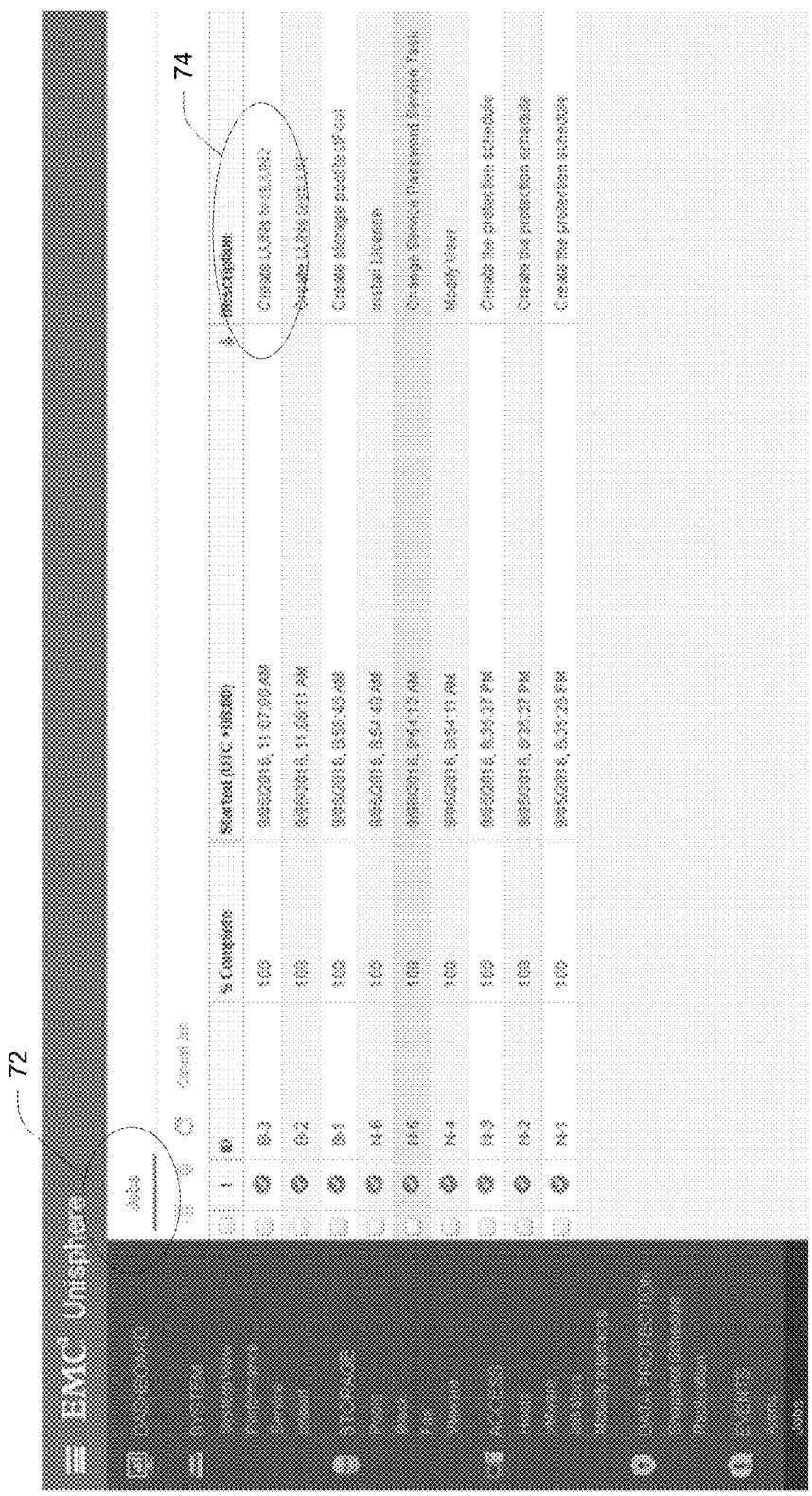
FIGS. 4-6 are graphical user interface screens.

FIG. 4 shows a GUI display screen 70 being part of a GUI delivered by the management component 22 to management station 24 (FIG. 2). The screen 70 is a "Jobs" screen (note heading 72) displaying information about jobs currently or recently executed. As indicated at 74, the Description field for some jobs includes not only a description of the function of the job, e.g., "Create LUNs", but also one or more identifiers of resources 36 affected by the job, e.g., "testLUN", testLUN2". These are examples of the human-friendly resource_name described above. Also in this case these items are formatted as hyperlinks that can be activated by user selection to enable a user to navigate to display screens specific to the identified items, as described more below. In prior systems, a Jobs-level screen such as 72 might include only the functional description of a job 32 ("Create LUNs"), leaving a user uninformed about the actual particular resources 36 that are being affected by the underlying tasks 30. Using the presently disclosed technique of promoting resource identifiers to parent objects, the identifiers 74 of the affected devices ("testLUN", "testLUN2") are immediately available at the Job level.

Figure 5:
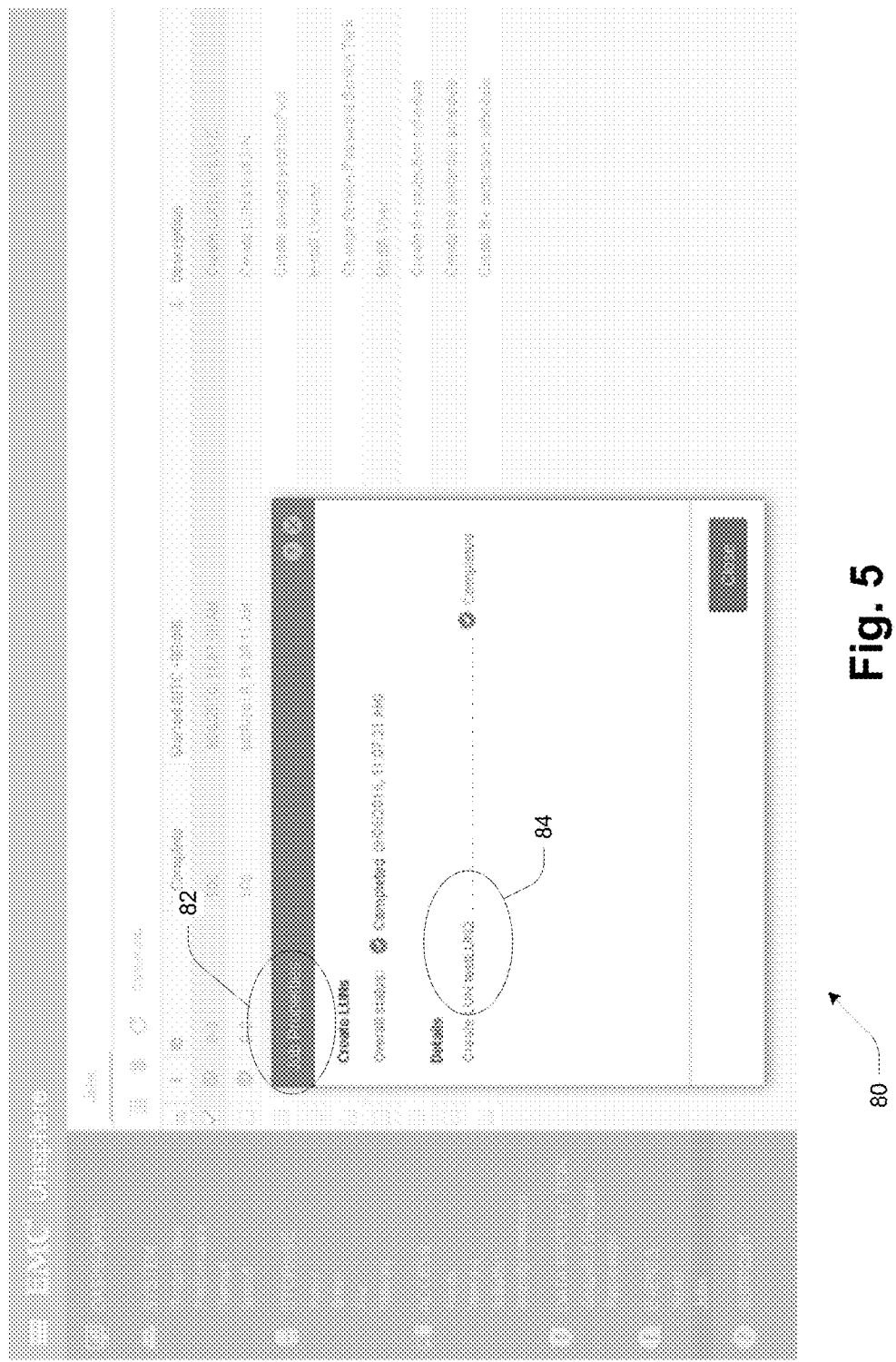
Figure 6:
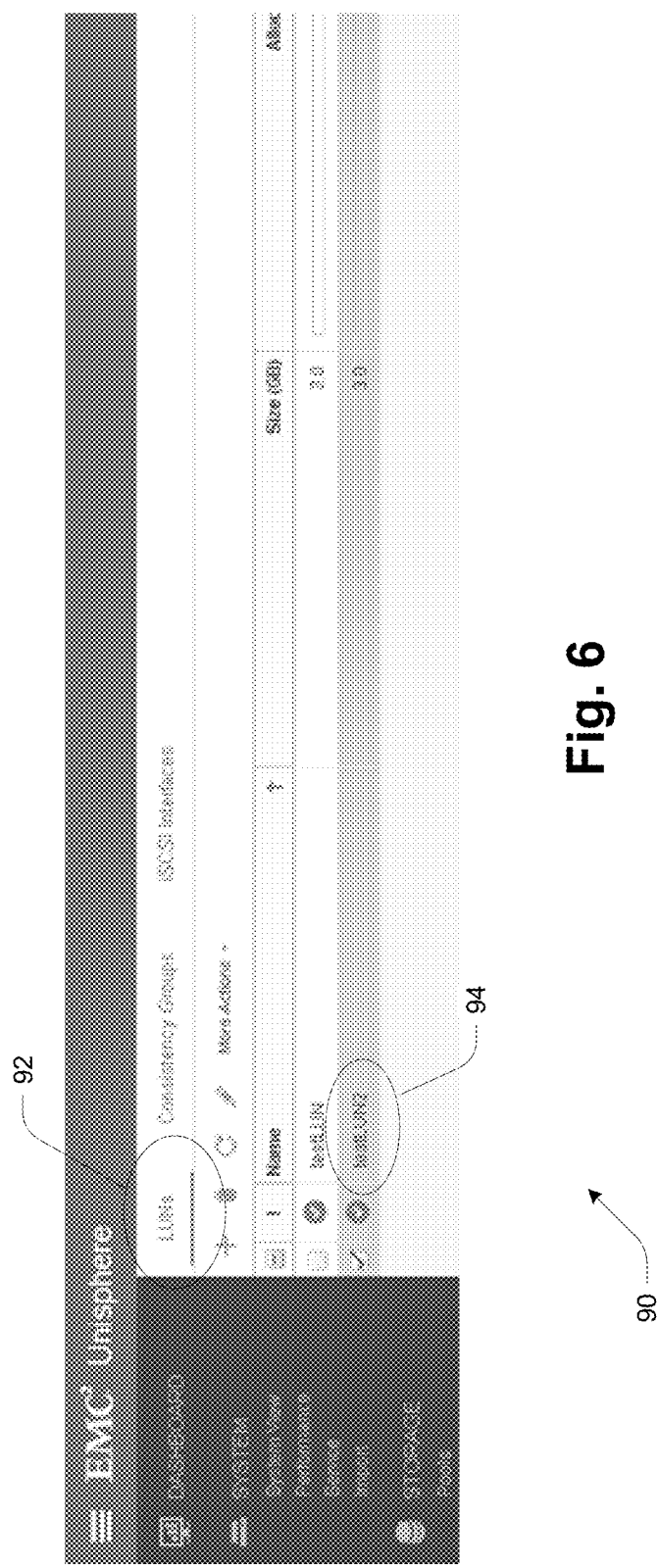

FIGS. 5 and 6 illustrate additional screens 80 and 90 that form part of the same GUI as the screen 70. Screen 80 is a Job Properties screen (note ref 82) for an instance of the CreateLUNs job that involves testLUN2, which appears at 84 as a hyperlink in a Details area. Screen 90 is a LUNs screen (note ref. 92) which includes respective table rows for testLUN and testLUN2 (ref 94). This screen may be navigated to by user selection of a hyperlink 84 or 74.

While various embodiments of the invention have been particularly shown and described, it will be understood by those skilled in the art that various changes in form and details may be made therein without departing from the scope of the invention as defined by the appended claims.

What is claimed is:

1. A method of operating a data storage system executing a system management component for initiating and monitoring a multi-task job affecting a storage resource of the data storage system, the multi-task job having an organizational job-level function and lower-level tasks, comprising:
   maintaining a job data object and a set of task data objects for the multi-task job, at least one of the tasks operating upon the storage resource and having a respective task data object containing an identifier of the storage resource as a task-affected storage resource, the job data object being used by the job-level function and initially lacking the identifier of the storage resource;
   during execution of the multi-task job, copying the identifier of the storage resource from the task data object to the job data object as an identifier of a job-affected storage resource; and
   utilizing the identifier of the storage resource from the job data object in subsequent performance of the job-level function,
   wherein each task is a leaf object which performs specific operations directly on an affected storage resource and embeds information about the storage resource, including the identifier of the storage resource, into the respective task data object;
   and wherein each job is a higher level object which organizes a plurality of tasks to complete one user request, and does not directly operate upon the affected storage resource and thus lacks inherent knowledge about detail of the affected storage resource.

2. The method of claim 1, wherein the system management component provides a management user interface including a set of user interface screens providing information about the multi-task job to a management user, and further including:
   obtaining the identifier of the job-affected storage resource from the job data object and using the obtained identifier to create a human-readable identifier of the job-affected storage resource; and
   displaying the human-readable identifier of the job-affected storage resource to the management user on a job-level user interface screen.

3. The method of claim 2, wherein the user interface is a graphical user interface and the human-readable identifier of the job-affected storage resource is formatted as a hyperlink to a hypertext page providing information about the job-affected storage resource.

4. The method of claim 1, wherein the multi-task job further includes an organizational batch-job-level function, and wherein the method further includes:

maintaining a batch job data object for the multi-task job, batch job data object being used by the batch-job-level function and initially lacking the identifier of the storage resource;

during execution of the multi-task job, copying the identifier of the storage resource from the job data object to the batch job data object as an identifier of a job-affected storage resource; and utilizing the identifier of the storage resource from the batch job data object in subsequent performance of the batch-job-level function.

5. The method of claim 1, wherein the multi-task job, the job data object, and the task data object are created by action of an automated component.

6. The method of claim 5, wherein the automated component is one of a wizard or script.

7. The method of claim 1, wherein the storage resource is a storage device.

8. The method of claim 7, wherein the storage device is a logical storage device.

9. The method of claim 8, wherein the logical storage device is one of a LUN, logical volume, or virtual volume.

10. The method of claim 1, wherein copying of the identifier is controlled by an explicit parameter maintained by either or both the job data object and/or the task data object, the explicit parameter specifying whether the identifier is to be copied from the task data object to the job data object.

11. A data storage system, comprising:

data storage devices;

respective interfaces to the data storage devices and to remote host computers; and processing circuitry executing a system management component for initiating and monitoring a multi-task job affecting a storage resource of the data storage system, the multi-task job having an organizational job-level function and lower-level tasks, the execution of the system management component including:

maintaining a job data object and a set of task data objects for the multi-task job, at least one of the tasks operating upon the storage resource and having a respective task data object containing an identifier of the storage resource as a task-affected storage resource, the job data object being used by the job-level function and initially lacking the identifier of the storage resource;

during execution of the multi-task job, copying the identifier of the storage resource from the task data object to the job data object as an identifier of a job-affected storage resource; and utilizing the identifier of the storage resource from the job data object in subsequent performance of the job-level function, wherein each task is a leaf object which performs specific operations directly on an affected storage resource and embeds information about the storage resource, including the identifier of the storage resource, into the respective task data object;

and wherein each job is a higher level object which organizes a plurality of tasks to complete one user request, and does not directly operate upon the affected storage resource and thus lacks inherent knowledge about detail of the affected storage resource.

12. The data storage system of claim 11, wherein the system management component provides a management user interface including a set of user interface screens providing information about the multi-task job to a management user, and wherein the execution of the system management component further includes:

obtaining the identifier of the job-affected storage resource from the job data object and using the obtained identifier to create a human-readable identifier of the job-affected storage resource; and displaying the human-readable identifier of the job-affected storage resource to the management user on a job-level user interface screen.

13. The data storage system of claim 12, wherein the user interface is a graphical user interface and the human-readable identifier of the job-affected storage resource is formatted as a hyperlink to a hypertext page providing information about the job-affected storage resource.

14. The data storage system of claim 11, wherein the multi-task job further includes an organizational batch-job-level function, and wherein the execution of the system management component further includes:

maintaining a batch job data object for the multi-task job, batch job data object being used by the batch-job-level function and initially lacking the identifier of the storage resource;

during execution of the multi-task job, copying the identifier of the storage resource from the job data object to the batch job data object as an identifier of a job-affected storage resource; and utilizing the identifier of the storage resource from the batch job data object in subsequent performance of the batch-job-level function.

15. The data storage system of claim 11, wherein the multi-task job, the job data object, and the task data object are created by action of an automated component.

16. The data storage system of claim 15, wherein the automated component is one of a wizard or script.

17. The data storage system of claim 11, wherein the storage resource is a storage device.

18. The data storage system of claim 17, wherein the storage device is a logical storage device.

19. The data storage system of claim 18, wherein the logical storage device is one of a LUN, logical volume, or virtual volume.

20. The data storage system of claim 11, wherein copying of the identifier is controlled by an explicit parameter maintained by either or both the job data object and/or the task data object, the explicit parameter specifying whether the identifier is to be copied from the task data object to the job data object.

* * * * *